(12) United States Patent
Angel et al.

(10) Patent No.: US 6,867,262 B1
(45) Date of Patent: Mar. 15, 2005

(54) GRAFTED POLYMERS AS GAS HYDRATE INHIBITORS

(75) Inventors: Maximilian Angel, Schifferstadt (DE); Karin Neubecker, Frankenthal (DE); Axel Sanner, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 332 days.

(21) Appl. No.: 10/030,987

(22) PCT Filed: Jul. 11, 2000

(86) PCT No.: PCT/EP00/06564

§ 371 (c)(1),
(2), (4) Date: Jan. 16, 2002

(87) PCT Pub. No.: WO01/09271

PCT Pub. Date: Feb. 8, 2001

(30) Foreign Application Priority Data

Jul. 28, 1999 (DE) .......................... 199 35 063

(51) Int. Cl.[7] .............. C07C 7/00; C07C 7/20; C08F 226/00; C08F 26/00
(52) U.S. Cl. ............ 525/326.9; 526/264; 507/90; 507/246; 585/15; 585/950; 95/153; 208/48 AA
(58) Field of Search ............ 525/326.9; 526/264; 307/90, 246; 585/15, 950; 95/153; 208/48 AA

(56) References Cited

U.S. PATENT DOCUMENTS

| | | | |
|---|---|---|---|
| 5,432,292 A | | 7/1995 | Sloan, Jr. .................. 585/15 |
| 5,491,269 A | * | 2/1996 | Colle et al. ................ 585/15 |
| 5,583,273 A | * | 12/1996 | Colle et al. ................ 585/15 |
| 5,900,516 A | * | 5/1999 | Talley et al. ............... 585/15 |
| 6,102,986 A | * | 8/2000 | Klug ........................... 95/153 |
| 6,177,497 B1 | * | 1/2001 | Klug et al. ............... 524/376 |
| 6,319,971 B1 | * | 11/2001 | Kelland et al. ........... 524/379 |
| 6,329,472 B1 | * | 12/2001 | Kim et al. ............... 525/326.9 |
| 6,444,852 B1 | * | 9/2002 | Milburn et al. ........... 564/292 |
| 6,566,309 B1 | * | 5/2003 | Klug et al. ................ 507/90 |

FOREIGN PATENT DOCUMENTS

WO   96 29501   9/1996

* cited by examiner

*Primary Examiner*—Patricia Hampton Hightower
(74) *Attorney, Agent, or Firm*—Oblon, Spivak, McClelland, Maier & Neustadt, P.C.

(57) ABSTRACT

Graft polymers are used as gas hydrate inhibitors.

16 Claims, No Drawings

GRAFTED POLYMERS AS GAS HYDRATE INHIBITORS

BACKGROUND OF THE INVENTION

1. Field of the Invention

The invention relates to the use of graft polymers as gas hydrate inhibitors.

2. Description of the Background

It is known that gas hydrates, also termed clathrate hydrates, can form under certain conditions in media which comprise gas molecules, such as $CO_2$ or hydrocarbons, e.g. $C_1$–$C_4$-alkanes, and water. These gas hydrates are composed of the gas molecules mentioned surrounded by a "cage" of water molecules. Gas hydrates of this type also occur when water is present in mineral oil mixtures or in natural gas mixtures and, for example during transportation, they can lead to blocking of the pipelines.

To prevent this, gas hydrate inhibitors are added to the mineral oil mixtures or natural gas mixtures.

WO 96/41784 and WO 96/41785 disclose gas hydrate inhibitors composed of a copolymer of N-methyl-N-vinylacetamide (VIMA).

U.S. Pat. No. 5,420,370, U.S. Pat. No. 5,432,292, WO 94/12 761 and WO 95/32 356 disclose polymeric additives for clathrate hydrate inhibition in liquid systems. These have a comonomer with a lactam ring in the polymer.

Polyvinylcaprolactam in particular, and also copolymers of polyvinylcaprolactam with, for example, vinylpyrrolidone, have a cloud point when dissolved in water, i.e. a certain temperature at which the polymer precipitates (inverse solubility). For pure polyvinylcaprolactam this is from about 30 to 35° C. A low cloud point such as this is sometimes disadvantageous for the gas hydrate inhibitor application, since the polymer can precipitate in the gas/oil/water phase which is to be conveyed if the temperature of this phase (i.e. including the water of this phase) is high, as is very likely to occur in practice. Use is therefore widely made of copolymers of vinylcaprolactam with, for example, vinylpyrrolidone, or else with other hydrophilic monomers which raise the cloud point, including, for example, ionic monomers which have ionic groups such as carboxyl, sulfonate or (quaternized) ammonium (WO 96/38492).

WO 96/38492 discloses gas hydrate inhibitors comprising a polymer which has a 3- to 15-membered ring bonded to the polymer via a particular linking unit (spacer).

Graft polymers per se are known from the prior art. For example, the German Patents DBP 1077430, 1081229, 1084917 and 1094457 describe processes for preparing various graft polymers, such as graft polymers of polyvinyl esters or modified polyvinyl alcohols. EP 285 038 discloses the use of graft polymers based on polyalkylene oxides as graying inhibitors. EP 44 995 discloses graft polymers of PVA.

SUMMARY OF THE INVENTION

It is an object of the present invention to provide polymers which can be used as gas hydrate inhibitors and can be prepared more cost-effectively and can be varied to meet a variety of industrial requirements. The structure of these polymers must be such that they interact with differing interfaces or surfaces, in particular in complex gas-water mixtures and at a variety of temperatures with the result that no gas hydrates form, and it must be possible to use readily available monomers to build up the polymers.

We have found that this object is achieved by using graft polymers as gas hydrate inhibitors.

DETAILED DESCRIPTION OF THE PREFERRED EMBODIMENTS

The idea of using graft polymers as gas hydrate inhibitors enables individual polymer components, such as the base polymer (also termed the graft base), and the monomers to be grafted on, to be ideally matched to one another as requirements dictate, inter alia in terms of their spatial arrangement.

The graft polymers in their entirety may be water-soluble or merely water-dispersible. As long as a dispersion of the polymers in water can be produced using the usual methods, the graft polymers used may per se also be water-insoluble, but preference is given to water-soluble graft polymers. The graft polymers used according to the invention may also be "comb polymers".

The graft base of the graft polymers may be either a hydrophilic polymer or a hydrophobic polymer, preferably a hydrophilic polymer. Polymers with a hydrophobic part and a hydrophilic part may also be used. There is a wide variety of possible monomers for the units grafted on. It is precisely this variability of the system which is an advantage of the present invention.

The graft polymers may therefore be used with a wide variety of solvents in mixtures for gas hydrate inhibition.

Solvents which may be used for the gas hydrate inhibitors are alcohols, e.g. methanol, isopropanol or butyl glycol, and also ethers, in particular partially etherified glycols, and synergistic effects are possible with some solvents (see also WO 98/19980). Solvents with a high flashpoint and a low ground water pollution classification, e.g. water or ethylene glycol, are preferred for handling reasons, e.g. to reduce safety risks and for reasons of toxicity.

The possibility of using water is seen as a particular advantage of the use according to the invention of the graft polymers.

However, it is also possible to use ethylene glycol, which is chemically closely related to some preferred graft polymers. Low-molecular-weight polyalkylene glycols, in particular polyethylene glycol, may be added subsequently as solvent (for viscosity reasons). Their advantage is that they have a high flashpoint (about 111° C. in the case of ethylene glycol) combined with good aquatic toxicity values.

A polyalkylene glycol (liquid and low-molecular-weight), preferably polyethylene glycol, may even be used as solvent for any organic initiator (organic peroxide) which may be used in preparing the graft polymers, or for monomer which is not liquid at room temperature, for example vinylcaprolactam.

One way of making the graft polymers soluble or at least dispersible in water or in other polar solvents is to use a hydrophilic graft base for the graft polymer. Possible graft bases are polyalkylene glycols, polyvinyl alcohols, polyvinylamides, polyvinylpyrrolidone, polyethers, polyesters, polyurethanes, polyacrylamide, polysaccharides, e.g. starch, alginates, pectins, natural rubbers, caseins, gelatin, cellulose ethers, e.g. methylcellulose, starch ethers, polyalkyleneimines, polycarboxylic acids, polyvinylsulphonic acids or polyvinylphosphonic acids or copolymers of these. Preference is given to polyalkylene glycols, in particular polyethylene glycols, polyethyleneimines, polyvinyl alcohols, polyvinylpyrrolidone and polyvinylamine.

Possible hydrophobic base polymers are: polyalkylene glycols, such as ethylene oxide-propylene oxide copolymers or ethylene oxide-propylene oxide block copolymers, polyethers, poly(meth)acrylates, polyolefins, e.g. polyethylene, polypropylene, polyisobutylene, polybutadiene, polyisoprene, polystyrene and styrene copolymers, polyvinyl acetate, polyvinyl ethers, polyvinyl formals, polyvinyl acetals, polyvinyl chloride or other halogenated polyvinyl compounds, e.g. polyvinylidene chloride, polychloroprene, polytrifluorochloroethylene, polytetrafluoroethylene, polyacrylonitrile, polyamide, polyurethanes, silicones, polycarbonate, polyterephthalate, cellulose or cellulose esters or polyoxymethylene or copolymers of these.

Certain polymers may, as a result of their composition, have both hydrophilic and hydrophobic character. The skilled worker knows how to select the composition to achieve this in a particular case.

Possible monomers for the units grafted on may be water-soluble or water-insoluble. Preferred monomers are N-vinyllactams, N-vinylamides, in particular N-vinyl-N-methylacetamide, acrylates, acrylamides and/or vinyl esters, preferably N-vinyllactams, in particular N-vinylcaprolactam.

The units grafted on generally make up from 10 to 90% by weight, preferably from 25 to 75% by weight, particularly preferably from 40 to 60% by weight of the graft copolymers.

It is particularly advantageous to use graft polymers which have a hydrophilic base polymer and N-vinyllactams as the unit grafted on.

The invention therefore also provides graft polymers with a graft base of hydrophilic polymers having at least one heteroatom in the main chain and with N-vinylcaprolactam as the unit grafted on, and also, if desired, another monomer mentioned above.

According to the invention preference is given to graft polymers in which the graft base is a polyalkylene glycol, a polyalkyleneimine, a polyether or a polyurethane. Particular preference is given to polyethylene glycol as base polymer and N-vinylcaprolactam or N-vinylcaprolactam/vinyl acetate as monomer grafted on.

The graft polymers used according to the invention can be prepared in a manner known per se, e.g. as described in DE 1 077 430 or 1 084 917.

In these publications a mixture made from monomer (vinyl acetate)/polyalkylene glycol/initiator) is (generally) first prepared. This however, raises fundamental questions regarding safety. The polymerization of a part of the mixture is then begun and the remainder is added via a feed and—if desired with addition of solvent—polymerized to completion.

The process described in EP 0 219 048 (page 2, lines 49 ff.) may also be used. In this, polyalkylene oxide is, for example, the initial charge and monomer (vinyl acetate) and initiator are added all at once, in portions or continuously. Another process suitable for preparing the graft polymers used according to the invention is that described in EP 0 285 038 (polyalkylene oxide, vinylpyrrolidone, vinyl ester).

A preferred way of preparing the graft polymers used according to the invention is to heat the entire amount of, or most of, the base polymer, e.g. polyethylene glycol of molar mass typically from 200 to 40,000 g/mol, preferably from 600 to 10,000 g/mol, particularly preferably from 1500 to 6000 g/mol, in a stirred reactor until it becomes liquid, if appropriate.

The monomer, e.g. vinylcaprolactam—if desired mixed with a solvent, e.g. ethylene glycol—and a peroxidic initiator (e.g. tert-butyl 2-ethylperoxihexanoate)—if desired mixed with a solvent, e.g. methanol—are then metered in from separate feeds over a period of several hours while the initial charge is at, for example, 80° C. If the viscosity becomes excessive during the course of the reaction an appropriate amount of a solvent, preferably water or ethylene glycol, may be added. The addition may take place either at an earlier stage prior to the grafting reaction or at the start of this reaction, but preferably at the latest possible juncture during the grafting reaction and ideally not until the grafting reaction is complete. The amount of solvent metered in should be kept as small as possible.

After completion of the reaction polymerization may be continued, e.g. by adding another initiator. The pressure and temperature may be raised for this, if desired.

The finished polymer may be diluted with any desired solvent. It is advisable to dilute with water or ethylene glycol or with a mixture of the two.

In many cases the conversion of the grafting reaction may best be determined indirectly by determining the cloud point of the graft polymer and comparing with an ungrafted polymer. For this the polymer is usually dried and an aqueous solution, for example, is prepared from the dry polymer. The clouding of the solution or, respectively, the precipitation of the polymer as a function of temperature can easily be determined.

The cloud point may be determined to DIN 53 917.

The graft polymers may be used, also in combination with other suitable agents, as gas hydrate inhibitors.

These other agents may be other polymers, such as hydroxyalkylcelluloses, polyvinylpyrrolidone or polyvinylcaprolactam, or else alcohols, such as methanol, ethanol or ethylene glycol, or water-soluble salts, preferably in amounts of from 1 to 3.5% by weight, based on the weight of the entire liquid system.

The invention also provides a process for preventing or reducing the formation of gas hydrates in liquid or gaseous systems, which comprises adding a graft polymer to the liquid systems.

The K values of the graft polymers used according to the invention (determined as described by Fikentscher, Cellulose Chemie, 13, 58–64, 71–74, 1932; 1% strength aqueous solution, 20° C., K=k·$10^3$) are from 10 to 120, preferably from 15 to 90, in particular from 20 to 60. The molecular weights of the graft polymers ($M_w$) are from 2000 to 1,000,000, preferably from 500 to 300,000, particularly preferably from 10,000 to 100,000.

The graft polymers which can be used according to the invention as gas hydrate inhibitors may be used either in pure aqueous solution or else in solvent mixtures, e.g. water/alcohol, in particular ethylene glycol. After removal of the solvent and, if desired, drying, the polymers may also be used in powder form. If the graft polymers have hydrophilic character powders of this type can easily be redispersed or, respectively, redissolved for the purposes of the invention at their point of use in media in which water is present and in which gas hydrate tends to form.

The polymers are added to the liquid systems, i.e. to the mineral oil mixtures or natural gas mixtures, in the usual amounts which the skilled worker will adapt to the circumstances of each case.

EXAMPLES

Example 1

|  |  | g | % by weight |  |
|---|---|---|---|---|
| Initial charge | Pluriol E 6000 | 300 | 50 |  |
| Feed 1 | vinylcaprolactam | 150 | 25 |  |
|  | vinyl acetate | 150 | 25 |  |
| Feed 2 | tert-butyl 2-ethyl-peroxyhexanoate (98% strength) | 4 | = 1.3% | based on monomers |
|  | methanol | 30 |  |  |
| Feed 3 | demineralized water | 900 |  |  |

Pluriol E 6000: polyethylene glycol with molecular weight 6000

The initial charge was stirred at 150 rpm in a 2 l HWS mixer under a slow flow of nitrogen and heated to an external temperature of 100° C.

Once the polyethylene glycol with molecular weight 6000 (Pluriol E 6000, BASF AG) in the initial charge had been completely melted, 10% of feed 2 was added to the initial charge and stirred for 5 min. Feeds 1 and 2 were then added dropwise, in each case over a period of 5 h. Once the feeds had been completed polymerization was continued for 3 h. Feed 3 was then added over a period of 30 min, followed by cooling.

Solids content in % by weight: 38.1

K value 21.6 (measured at 1% strength in ethanol)

Example 2

Preparation as in Example 1, experiment at 100° C. external temperature. Cf. Table 1.

Example 3

|  |  | g | % by weight |  |
|---|---|---|---|---|
| Initial charge | PTHF 1000* | 180 | 30 |  |
|  | Partial quantity of feed 2 | 7 |  |  |
| Feed 1 | vinyl acetate | 60 | 10 |  |
|  | vinylpyrrolidone | 315 | 52.5 |  |
| Feed 2 | tert-butyl 2-ethyl-peroxyhexanoate (98% strength) | 4.5 | = 1.1% | based on monomers |
|  | methanol | 45 |  |  |
| Feed 3 | vinylpyrrolidone | 45 | 7.5 |  |
| Feed 4 | tert-butyl 2-ethyl-peroxyhexanoate (98% strength) | 1.3 | = 0.3% | based on monomers |
|  | methanol | 13 |  |  |
| Feed 5 | demineralized water | 880 |  |  |

*polytetrahydrofuran with molecular weight 1000 (hydrophobic)

The experiment was carried out in a 6 l stirred Juvo reactor. The reactor was pressurized three times with nitrogen at 10 bar. The initial charge with the partial quantity of feed 2 was heated to an internal temperature of about 95° C. At 95° C. feeds 1 and 2 were begun. Feed 1 was metered in within a period of 6 h and feed 2 within a period of 8 h. Once feed 1 had been completed feed 3 was metered in within a period of 1.5 h. Once feed 2 had been completed polymerization was continued for 1 h. Feed 4 was metered in over a period of 2 h (still) at 95° C. Once feed 4 had been completed polymerization was continued for a further 3 h at 95° C. Feed 5 was then added over a period of 30 min, followed by cooling.

Example 4

Preparation as in Example 1, experiment at 90° C. external temperature. Cf. Table 1.

Example 5

Preparation as in Example 1 (unlike in Example 1 PTHF 250 (polytetrahydrofuran with molecular weight 250, hydrophilic) is a clear solution and requires no melting). Experiment at 100° C. external temperature. Cf. Table 1.

Example 6

Preparation as in Example 1, experiment at 80° C. external temperature. Cf. Table 1.

Since the experiment gave a very high viscosity after feeds 1 and 2 had been completed, a partial quantity of feed 3 (300 g of water) was added straight away during the further polymerization. The remaining amount of water was added prior to cooling.

TABLE 1

Compositions for the experiments of the examples

| Ex. | Initiator Type | % by wt.* | GB** | % GB by wt. | VCap % by wt. | VAc % by wt. | VP % by wt. | K value *** | SC % by wt. |
|---|---|---|---|---|---|---|---|---|---|
| 1 | tBEPHA | 1.3 | Pluriol E 6000 | 50 | 25 | 25 |  | 21.6 | 38.1 |
| 2 | tBEPHA | 1.6 | Pluriol E 6000 | 60 | 40 |  |  | 22.8 | 40.1 |
| 3 | tBEPHA | 1.4 | PTHF 1000 | 30 |  | 10 | 60 | 22.9 | 38.5 |
| 4 | tBPPiv | 1.3 | Pluriol E 6000 | 50 | 40 | 10 |  | 23.9 | 39.3 |
| 5 | tBEPHA | 1.2 | PTHF 250 | 35 | 30 |  | 35 | 22.5 | 40.1 |
| 6 | tBPPiv | 1.4 | Pluriol E 6000 | 50 | 30 |  | 20 | 26.4 | 40.4 |

| | |
|---|---|
| * | based on monomer |
| ** | GB = graft base |
| *** | 1% strength in ethanol |
| % by wt. | % by weight |
| tBEPHA | tert-butyl 2-ethylperoxyhexanoate |
| tBPPiv | tert-butyl peroxypivalate |
| PTHF (250) | polytetrahydrofuran (molecular weight) |
| VCap | vinylcaprolactam |
| VAc | vinyl acetate |
| VP | vinylpyrrolidone |
| SC | Solids content |

TABLE 2

Freezing point results (ball stop method) and cloud point (0.5% by weight of polymer in water)

| Example | Ball stop ° C. | Cloud point ° C. | Comments |
|---|---|---|---|
| Comp. 1 | 4.0 | — | Ball stop zero value (no polymer) |
| Comp. 2 | 0.5 | 32 | Vinylcaprolactam homopolymer (K value 20) |
| Comp. 3 | 3.0 | >100 | Vinylpyrrolidone homopolymer (K value 20) |
| 1 | 2.0 | 80 |  |

TABLE 2-continued

Freezing point results (ball stop method) and cloud point
(0.5% by weight of polymer in water)

| Example | Ball stop °C. | Cloud point °C. | Comments |
|---|---|---|---|
| 2 | 1.5 | 90 | Minimal clouding at 50° C. (disappears again) |
| 3 | 2.5 | 90 | Slight clouding |
| 4 | 1.5 | 90 | Minimal clouding at 40° C. (disappears again) |
| 5 | 1.0 | 75 | |
| 6 | 1.5 | 65 | |

The freezing point was determined by the "Ball stop method" using a test method similar to that described in Example 1 of WO95/32356.

This method relates to the testing of freezing points of water/THF mixtures resulting from adding a variety of polymers (demonstrating hydrate formation). These are frozen at 0.5% strength in a water/THF (81/19% by weight) mixture.

The following equipment and reagents are needed to determine the freezing point of a variety of polymers/(water/THF) mixtures:

water/THF mixture (81/19% by weight)
Julabo F 18 temperature-controlled bath with water/ethylene glycol (5/1) refrigerant mixture
Multifix Constant stirrer
holder for test tubes (5 ml)
small stainless steel balls to improve mixing in the test tube A 0.5% strength solution of the polymer to be studied was prepared in water/THF (81/19). The test tube was filled to two thirds of its capacity, a small stainless steel ball was added and the tube was sealed and secured in the test-tube holder. The measurement was started at 4° C. bath temperature and with a rotation rate of 20 rpm, and the temperature was lowered by 0.5° C. hourly until the sample had frozen or, respectively, the steel ball was no longer moving within the test tube, or 0° C. had been reached. A blank sample was run in parallel with each measurement.

We claim:

1. A graft polymer comprising:
a hydrophilic base polymer which is a polyalkylene glycol, a polyether or a polymer having at least one heteroatom in the main chain, with the proviso that polyphenylene ether is excluded as a base polymer, having a N-vinyllactam grafted thereon.

2. A method of inhibiting gas hydrates, comprising:
contacting a gas hydrate with a graft copolymer.

3. The method as claimed in claim 2, wherein the graft polymers have a hydrophilic and/or hydrophobic base polymer.

4. The method as claimed in claim 2, wherein the hydrophilic base polymers are selected from the group consisting of polyalkylene glycols, polyvinyl alcohols, polyvinylamides, polyvinylpyrrolidone, polyethers, polyesters, polyurethanes, polyacrylamides, polysaccharides, cellulose ethers, polyalkyleneimines, polycarboxylic acids, polyvinylsulfonic acids, polyvinylphosphonic acids and copolymers of the monomer components of these polymers.

5. The method as claimed in claim 3, wherein the hydrophobic base polymers are selected from the group consisting of polyalkylene glycols, such as ethylene oxide-propylene oxide copolymers or ethylene oxide-propylene oxide block copolymers, polyethers, poly(meth)acrylates, polyolefins, polystyrene or styrene copolymers, polyvinyl acetate, polyvinyl ethers, polyvinyl formals, polyvinyl acetals, polyvinyl chloride or other halogenated polyvinyl compounds, polyacrylonitrile, polyamides, polyurethanes, silicones, polycarbonates, polyterephthalates, cellulose, cellulose ethers, cellulose esters, polyoxymethylene and copolymers of the monomer components of these polymers.

6. The use The method as claimed in claim 2, wherein the graft polymers contain grafted-on units of water-soluble and/or water-insoluble monomers.

7. The method as claimed in claim 6, wherein the units grafted onto the base polymer make-up from 10 to 90% by weight of the graft polymer.

8. The method as claimed in claim 6, wherein the units grafted on onto the base polymer comprise N-vinyllactams, N-vinylamides, acrylates, arylamides and/or a vinyl esters.

9. The method as claimed in claim 8, wherein the units grafted on onto the base polymer comprise N-vinylcaprolactam.

10. The graft polymer as claimed in claim 2, wherein the hydrophilic base polymer is polyethylene glycol.

11. The graft polymer as claimed in claim 2, wherein the unit grafted onto the base polymer is N-vinylcaprolactam.

12. A process for preventing or reducing the formation of gas hydrates in liquid or gaseous systems, which comprises:
adding a graft polymer of claim 1 to the liquid or gaseous system.

13. The graft polymer as claimed in claim 1, wherein said polymer having at least one heteroatom in the main chain is a polyurethane or a polyalkyleneimine and said N-vinyllactam is grafted onto the base polymer with a N-vinylamide, an acrylate, an acrylamide and/or a vinyl ester monomer.

14. The method as claimed in claim 7, wherein the units grafted onto the base polymer make-up from 25 to 75% by weight of the graft polymer.

15. A method of inhibiting gas hydrates, comprising:
contacting a gas hydrate with a graft copolymer prepared by graft polymerizing a N-vinyllactam, a N-vinylamide, an acrylate, an arylamide or a vinyl ester onto a hydrophilic base polymer selected from the group consisting of polyalkylene glycols, polyvinyl alcohols, polyvinylamides, polyvinylpyrrolidone, polyethers, polyesters, polyurethanes, polyacrylamides, polysaccharides, cellulose ethers, polyalkyleneimines, polycarboxylic acids, polyvinylsulfonic acids, polyvinylphosphonic acids and copolymers of the monomer components of these polymers or onto a hydrophobic base polymer selected from the group consisting of polyalkylene glycols, polyethers, poly(meth)acrylates, polyolefins, polystyrene, styrene copolymers, polyvinyl acetate, polyvinyl ethers, polyvinyl formals, polyvinyl acetals, halogenated polyvinyl compounds, polyacrylonitrile, polyamides, polyurethanes, silicones, polycarbonates, polyterephthalates, cellulose, cellulose ethers, cellulose esters, polyoxymethylene and copolymers of the monomer components of these polymers, thereby removing water from the gas hydrate.

16. The process as claimed in claim 15, wherein the graft polymer is in the form of an aqueous solution or in a water/solvent mixture.

* * * * *